United States Patent
Morris (10) Patent No.: US 10,576,400 B2
(45) Date of Patent: Mar. 3, 2020

(54) DRAIN PROTECTION

(71) Applicant: Ertec Environmental Systems LLC, Alameda, CA (US)

(72) Inventor: Vincent P. Morris, Alameda, CA (US)

(73) Assignee: ERTEC ENVIRONMENTAL SYSTEMS LLC, Alameda, CA (US)

(*) Notice: Subject to any disclaimer, the term of this patent is extended or adjusted under 35 U.S.C. 154(b) by 8 days.

(21) Appl. No.: 16/005,347

(22) Filed: Jun. 11, 2018

(65) Prior Publication Data
US 2018/0320361 A1    Nov. 8, 2018

Related U.S. Application Data

(63) Continuation of application No. 15/285,430, filed on Oct. 4, 2016.

(51) Int. Cl.
*B01D 29/31* (2006.01)
*B01D 29/00* (2006.01)
*E03F 5/06* (2006.01)

(52) U.S. Cl.
CPC ............ *B01D 29/0095* (2013.01); *E03F 5/06* (2013.01); *B01D 2201/34* (2013.01)

(58) Field of Classification Search
CPC ......... E01C 11/224; E03F 5/04; E03F 5/0404; E03F 5/046; B01D 29/31
USPC .................... 404/2, 4; 405/36; 210/163, 164
See application file for complete search history.

(56) References Cited

U.S. PATENT DOCUMENTS

| | | | | |
|---|---|---|---|---|
| 386,768 A * | 7/1888 | Burrows | .................. | E06B 9/02 49/465 |
| 3,321,080 A * | 5/1967 | Pansini | ................. | E04H 4/1236 210/163 |
| 5,702,595 A * | 12/1997 | Mossburg, Jr. | ........... | E03F 1/00 210/163 |
| 5,948,250 A * | 9/1999 | Middleton | ................ | C02F 1/40 210/232 |
| 5,954,952 A * | 9/1999 | Strawser, Sr. | .......... | B01D 29/01 210/164 |
| 6,083,402 A * | 7/2000 | Butler | ....................... | E03F 1/00 210/170.03 |
| 6,214,216 B1 * | 4/2001 | Isaacson | ................... | E03F 1/00 210/162 |
| 6,261,445 B1 * | 7/2001 | Singleton | ............... | B01D 29/15 210/163 |
| 6,274,036 B1 * | 8/2001 | Ellis | ........................ | B01D 29/27 210/164 |
| 6,551,505 B2 * | 4/2003 | Chinn | .................... | B01D 29/05 210/164 |
| 7,070,691 B2 * | 7/2006 | Lindemulder | ............ | E03F 1/00 210/164 |

(Continued)

*Primary Examiner* — Thomas B Will
*Assistant Examiner* — Katherine J Chu
(74) *Attorney, Agent, or Firm* — T.H.P. Richardson (57) ABSTRACT

A protected drain assembly comprising a drain which is at least partially bordered by a hard surface, and which is protected by a drain cover assembly which comprises
(A) a polymeric sheet which (i) is on top of the drain and (ii) (a) is substantially impervious to water or (b) comprises a central portion which, when a sediment-containing liquid is placed on top of it, allows the liquid to pass through it, and
(B) gaskets which (i) are attached to edges of the polymeric sheet and (ii) secure the edges of the polymeric sheet to the hard surface.

26 Claims, 4 Drawing Sheets

(56) References Cited

U.S. PATENT DOCUMENTS

| | | | | |
|---|---|---|---|---|
| 7,096,627 | B2* | 8/2006 | Wade | E04D 13/0645 |
| | | | | 137/357 |
| 7,131,787 | B2* | 11/2006 | McGinn | E03F 5/0404 |
| | | | | 405/36 |
| 7,875,178 | B2* | 1/2011 | Ashliman | B01D 24/007 |
| | | | | 210/323.1 |
| 8,043,498 | B2* | 10/2011 | Rueda | E03F 1/00 |
| | | | | 210/164 |
| 8,051,568 | B2* | 11/2011 | Moody | E03F 1/00 |
| | | | | 210/164 |
| 9,045,874 | B1* | 6/2015 | Kondas | E03F 1/002 |
| 9,114,339 | B2* | 8/2015 | Israel | B01D 39/1615 |
| 10,407,891 | B1* | 9/2019 | Sanguinetti | E03F 5/06 |
| 2002/0104789 | A1* | 8/2002 | Harris | E03F 1/00 |
| | | | | 210/162 |
| 2004/0011731 | A1* | 1/2004 | Sanguinetti | E03F 1/00 |
| | | | | 210/483 |
| 2005/0262624 | A1* | 12/2005 | Evans, Jr. | A47K 1/14 |
| | | | | 4/293 |
| 2017/0159259 | A1* | 6/2017 | Roure | E02D 17/202 |
| 2018/0340305 | A1* | 11/2018 | Ragsdale, Jr. | E02B 3/126 |
| 2019/0177962 | A1* | 6/2019 | Montague | E03F 5/0404 |

* cited by examiner

DRAIN PROTECTION

CROSS-REFERENCE TO RELATED APPLICATIONS AND PATENTS

This application is a continuation-in-part of, and claims priority from, copending application Ser. No. 15/285,430 filed Oct. 4, 2016, by Ertec Environmental Systems LLC. This application is also related to U.S. Pat. Nos. 6,848,866, 7,008,144, 7,131,787, 7,172,372, 7,554,016, 7,955,030 and 8,402,630 and to U.S. patent application Ser. No. 14/279,977, filed May 16, 2014. The entire disclosure of each of those patents and those applications is incorporated by reference herein for all purposes.

BACKGROUND OF THE INVENTION

This invention relates to assemblies and methods for protecting drains.

SUMMARY OF THE INVENTION

In a first aspect, this invention provides a drain cover assembly which can be placed over a drain in the road and which comprises
  (A) a self-supporting polymeric sheet which comprises
    (1) a central portion,
    (2) a first side edge portion which contacts and extends from one side of the central portion,
    (3) a second edge portion which contacts and extends from an opposite side of the central portion,
    (4) a front edge portion which (i) contacts and extends from a front edge of the central portion and (ii) is attached to the first and second edge portions, and
    (5) a rear edge portion which (i) contacts and extends from a rear edge of the central portion and (ii) is attached to the first and second edge portions;
  (B) a first side edge gasket which (i) comprises an inner gasket portion which contacts and lies over or under the first side edge portion of the polymeric sheet and (ii) an outer gasket portion which extends away from the first side edge portion of the polymeric sheet; and
  (C) a second side edge gasket which (i) comprises an inner gasket portion which contacts and lies over or under the second side edge portion of the polymeric sheet and (ii) an outer gasket portion which extends away from the second side edge portion of the polymeric sheet.
The term polymeric sheet is used in this specification (including the claims) to denote a sheet which is composed of an organic polymer and, optionally, conventional additives such as fillers.

The preferred size of the polymeric sheet is determined by the size of the drain to be protected, and, when relevant, the largest size that can be conveniently shipped. The polymeric sheet will normally cover the entire drain, but it may extend beyond the drain on one or more sides. For rectangular (including square) drains, the length of each side will often be 2-6 feet, e.g. 2-4 feet. For long thin drains (e.g. slot drains and trench drains), the polymeric sheet may for example be 4-30, e.g. 4-9 inches wide and up to 7 feet long. When necessary or convenient, two or more drain cover assemblies can be used together for very large drains.

In some embodiments of the invention, at least part of the central portion of the polymeric sheet comprises apertures which allow water to pass through the central portion into a drain over which the assembly has been placed. In other embodiments, the polymeric sheet and each of the edge gaskets allows little or no water to pass through it, so that little or no water can enter a drain over which the assembly has been placed.

In a first embodiment of the first aspect of the invention, the drain cover assembly is particularly useful for protecting a drain which is long and thin and which optionally comprises members which, when the drain cover is in place, support part of the central portion of the polymeric sheet. In this embodiment, (i) the drain cover includes the first side edge gasket and the second side edge gasket, (ii) each of the gaskets extends at least up to, and often beyond, the end of the polymeric sheet, and (iii) the central portion of the polymeric sheet extends beyond the ends of the drain; and (iv) the presence of edge gaskets at the ends of the polymeric sheet is optional.

In a second embodiment of the first aspect of the invention, the drain cover assembly (i) is particularly useful for protecting a drain which (a) is rectangular, with substantial width and length, (b) comprises members which, when the drain cover is in place, support at least part of the polymeric sheet and (c) is bordered on all sides by a roadway, parking lot, service yard, floor of a waste management transfer station or industrial production facility, or other hard surface. For this use, the drain cover assembly comprises, in addition to the first and second side edge gaskets,
  (D) a front edge gasket which (i) comprises an inner gasket portion which contacts and lies over or under the front edge portion of the polymeric sheet, (ii) comprises an outer gasket portion which extends away from the front edge portion of the polymeric sheet and (iii) contacts the first side edge gasket and the second side edge gasket;
  (E) a rear edge gasket which (i) comprises an inner gasket portion which contacts and lies over or under the rear edge portion of the polymeric sheet, (ii) comprises an outer gasket portion which extends away from the front edge portion of the polymeric sheet and (iii) contacts the first side edge gasket and the second side edge gasket.

In a third embodiment of the first aspect of the invention, the drain cover assembly is particularly useful for protecting a drain which (a) is rectangular, with substantial width and length, (b) comprises members which, when the drain cover is in place, support at least part of the central portion of the polymeric sheet, (c) is bordered by a roadway or other hard surface on the front and on each side, and (d) has a rear section which is an opening in a curb of a sidewalk. For this use, the drain cover assembly comprises, in addition to the first and second side edge gaskets,
  (D) a front edge gasket which (i) comprises an inner gasket portion which contacts and lies over or under the front edge portion of the polymeric sheet, (ii) comprises an outer gasket portion which extends away from the front edge portion of the polymeric sheet and (iii) contacts the first side edge gasket and the second side edge gasket.
In this use, the assembly optionally comprises a rear edge portion which is not covered by the side edge gaskets and which, when the drain assembly is in use, extends upwards from the central portion of the polymeric sheet to cover at least part of the opening in the curb of the sidewalk. The rear edge portion, when it extends upwards from the central portion of the polymeric sheet, can optionally be created by bending upwards a rear edge portion of the polymeric sheet before or after the gaskets are secured to the central portion of the polymeric sheet and before or after the drain cover has been placed over the drain.

In a second aspect, this invention provides a protected drain assembly which comprises (1) a drain which is bordered on at least three sides by a hard surface, and (2) a drain cover assembly according to the first aspect of the invention, wherein (a) at least part of the central portion of the polymeric sheet lies over the drain, (b) the drain optionally comprises members which contact and support at least part of the central portion of the polymeric sheet, (c) at least part of the inner gasket portion of the first side edge gasket is over the drain or over a part of the hard surface which borders the drain, (d) at least part of the outer gasket portion of the first side edge gasket contacts a part of the hard surface which borders the drain, (e) at least part of the inner gasket portion of the second side edge gasket is over the drain or over a part of the hard surface which borders the drain, and (f) at least part of the outer gasket portion of the second side edge gasket is over the drain or over the hard surface which borders the drain.

In a third aspect this invention provides a method of preparing a protected drain assembly comprising a drain which is at least partially bordered by a hard surface, the method comprising (A) placing over the drain a polymeric sheet which comprises
  (1) a central portion,
  (2) a first side edge portion which contacts and extends from one side of the central portion,
  (3) a second edge portion which contacts and extends from an opposite side of the central portion,
  (4) a front edge portion which (i) contacts and extends from a front edge of the central portion and (ii) is attached to the first and second edge portions,
  (5) a rear edge portion which (i) contacts and extends from a rear edge of the central portion and (ii) is attached to the first and second edge portions;
and
(B) before or after step (A), providing gaskets which (i) are attached to at least two edges of the polymeric sheet and (ii) secure the edges of the polymeric sheet to the hard surface.

In a fourth aspect, this invention provides a gasket which is suitable for use in the drain cover assemblies of the first aspect of the invention and which is a strip of a porous nonwoven fabric, preferably a melt blown polymeric fabric, which has been folded lengthwise so that it comprises
  (A) an inner gasket portion, and
  (B) an outer gasket portion which is generally coplanar with the inner gasket portion, and, optionally, but
  (C) a berm which extends upwards from the inner and outer gasket portions.

The gasket is preferably formed by (1) folding the strip of the fabric lengthways, (2) sewing a lengthways seam between the two sides of the fabric, with the distance of the seam from the tip of the fold determining the height of the berm, and (3) flattening the strip of fabric.

BRIEF DESCRIPTION OF THE DRAWINGS

The invention is illustrated in the accompanying drawings which are diagrammatic sketches and are not to scale, and in which.

DETAILED DESCRIPTION OF THE INVENTION

In the Summary of the Invention above, the Detailed Description of the Invention, the Examples, and the claims below, and in the accompanying drawings, reference is made to particular features of the invention, including for example components, ingredients, devices, apparatus, systems, test results and steps. It is to be understood that the disclosure of the invention in this specification includes all possible combinations of such particular features. For example, where a particular feature is disclosed in the context of a particular mode, aspect, embodiment, Figure or claim, that feature can also be used, to the extent possible, in the context of any other particular mode, aspect, embodiment, Figure or claim, and in the invention generally. The invention disclosed and claimed herein includes embodiments not specifically described herein and can for example make use of features which are not specifically described herein but which provide functions which are the same, equivalent or similar to, features specifically disclosed herein.

The term "comprises" and grammatical equivalents thereof are used herein to mean that other features are optionally present. For example, the drain cover assembly defined above which comprises the specified components (A), (B) and (C) can consist of those specified components or can also contain other components, for example the specified components (D) and (E), or other non-specified components. Where reference is made herein to a method comprising two or more defined steps, then, unless the context requires otherwise, the defined steps can be carried out in any order or simultaneously, and the method can include one or more other steps which are carried out before any of the defined steps, between two of the defined steps, or after all the defined steps. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. When, in this specification, a range is given as "(a first number) to (a second number)" or "(a first number)–(a second number)", this means a range whose lower limit is the first number and whose upper limit is the second number. For example, "0.5-3" means a range whose lower limit is 0.5, and whose upper limit is 3. The numbers given herein should be construed with the latitude appropriate to their context and expression. The terms "plural" and "plurality" are used herein to mean two or more. When reference is made herein to "a", "an", "one" or "the" feature, it is to be understood that, unless the context requires otherwise, there can be one or more than one such feature.

Where reference is made herein to two or more components (or parts or portions etc.), it is to be understood that the components can be, unless the context requires otherwise, separate from each other or integral parts of a single structure or a single component acting as the two or more specified components.

When reference is made herein to a component being on one side, or at the front, or at the rear, or upwards or downwards, of an assembly, the reference is to the assembly in the horizontal position.

The Polymeric Sheets.

Polymeric Sheets Through which Water can Pass.

As previously noted, in some embodiments of the invention, at least part, and preferably all, of the central portion of the polymeric sheet comprises one or more apertured sheet materials in which the apertures allow liquid to pass through the sheet. In some embodiments, the polymeric sheet comprises, and optionally consists of, (1) a single apertured polymeric sheet, or (2) two or more apertured polymeric sheets which are joined together. The size of the apertures in the apertured polymeric sheet or sheets is preferably such that, when the assembly is placed over a drain, solids entrained in the liquid, e.g. debris, leaves, twigs and other materials having a similar or greater size, do not pass through the polymeric sheet into the drain.

The apertured polymeric sheet, or at least one of the apertured polymeric sheets if there are two or more polymeric sheets joined together can for example have one or more of the following optional characteristics.

(1) In the polymeric sheet, and in at least one of the polymeric sheets if there is more than one polymeric sheet, the apertures have the same size and/or shape.

(2) In the polymeric sheet, and in at least one of the polymeric sheets if there is more than one polymeric sheet, each of the apertures has an area of 0.01 to 1.0 in.$^2$, preferably 0.02 to 0.25 in.$^2$, and/or a minimum dimension of 0.1 to 1.0, preferably 0.15 to 0.5, inch.

(3) The polymeric sheet, and at least one of the polymeric sheets if there is more than one polymeric sheet, is composed of (a) a first set of polymeric strands (i) which are parallel to each other and (ii) are spaced apart from each other with a distance between adjacent strands of 0.1-1.0, e.g. 0.1 to 0.3 inch, and (b) a second set of polymeric strands (i) which are parallel to each other and at an angle of 30 to 90° to the first strands, (ii) which are bonded to the first strands of crossover points, and (iii) which are spaced apart from each other with a distance between adjacent strands of 0.1-1.0, e.g. 0.1 to 0.3 inch. The first and second polymeric strands can have a thickness in the laminar dimension of the sheet direction of the sheet between the crossover points of 0.04 to 0.5 inch.

(4) The polymeric sheet, and each of the polymeric sheets if there is more than one polymeric sheet, is composed of a polymeric composition which does not absorb substantial amounts of water and which can be recycled, for example a composition based on a polyolefin, particularly high density polyethylene or polypropylene.

(5) The polymeric sheet, and at least one of the polymeric sheets if there is more than one polymeric sheet, has a tensile strength in the machine direction of at least 400 pounds (ASTM D 4595) and in the transverse direction of at least 325 pounds (ASTM D4595).

(6) The solid surface area of the polymeric sheet is 10 to 80%, for example 25 to 65%, of its total area, both areas being viewed at right angles to the sheet material Additional details of suitable sheet materials are disclosed in U.S. Pat. Nos. 6,848,866, 8,402,630 and the other US patents which are incorporated herein by reference.

In some embodiments, at least part of the central portion of the apertured polymeric sheet comprises one or more first apertured polymeric sheets having relatively large apertures and a second sheet material through which water can pass but whose resistance to the passage of solids entrained in the water is greater than the first sheet or sheets. The second sheet material can, for example, be a second apertured polymeric sheet in which the apertures have a size less than the apertures in the first polymeric sheet or sheets. The second sheet material can act as a filter material so that, when a sediment-containing liquid is placed on top of the sheet, the liquid can pass through it but at least some of the sediment (although it can pass through the first polymeric sheet or sheets) is retained by the filter material. The additional sheet material can also be engineered so that it reduces the amount of other organic matter and chemicals, including hydrocarbons and aluminum, entering the drain.

When the self-supporting polymeric sheet includes one or more apertured first polymeric sheets and a second sheet material which acts as a filter, it is possible that in some circumstances, the area of the polymeric sheet which includes the second sheet material will become clogged by sediment and debris so that the drain ceases to function efficiently. To avoid this happening, it is possible for at least part of the polymeric sheet to be free of filter material, so that water can pass freely into the drain through that part of the polymeric sheet.

In one embodiment, the polymeric sheet comprises (i) two first polymeric sheets having relatively large apertures therethrough, and (ii) sandwiched between the two first and second sheet materials, an additional sheet material having relatively small apertures therethrough. The additional sheet material can extend over part or all of the area of the polymeric sheet.

The second sheet material, which has relatively small apertures therein and which, in use, acts as a filter for sediment, can for example have one or more of the following optional characteristics.

(1) It has a mesh size (measured by ASTM E-11) of 80 to 600 μm, preferably 100 to 500 μm, (2) It has a substantially uniform thickness of less than 0.5 inch, or less than 0.25 inch, for example 0.01-0.06, preferably 0.01-0.04 inch.

(3) It is composed of a polymeric composition which does not absorb substantial amounts of water, and which can be recycled in the same batch as the first and second sheet materials, for example a composition based on a polyolefin, particularly high density polyethylene or polypropylene.

(4) In tests in which clean water is passed through the second sheet material, on its own, the second sheet material is capable of passing at least 100, e.g. at least 200, gallons of water per square foot per minute, but not more than 600, e.g. not more than 400, gallons of water per square foot per minute.

Additional details of suitable sheet filter materials are disclosed in U.S. Pat. No. 6,848,868 and the other US patents which are incorporated herein by reference.

When the polymeric sheet includes two or more apertured polymeric sheets having the same or different apertures therein, the sheets can be secured to each other in any convenient way, for example by intermittent spot welding, sewing or stapling.

The polymeric sheet comprises a central portion, a first side edge portion, a second side edge portion, a front edge portion and a rear edge portion. These different portions will often be part of the same polymeric sheet, with or without an additional sheet of filter material, so that the edge portions have the same construction as the central portion.

In one embodiment, the central portion of the polymeric sheet is in the form of a broad peripheral border which (i) surrounds an opening which (a) is not covered by the polymeric sheet and when the drain cover assembly is in use, is open to the drain, and (ii) is surrounded by an internal gasket. This embodiment is useful when large water flows are expected, because the opening in the self-supporting polymeric sheet enables water to enter directly into the drain. The area of the opening can be for example 0.1-0.3 times the area of the peripheral border surrounding the opening.

Polymeric Sheets which are Substantially Impervious to Water.

In some embodiments of the invention, the polymeric sheet allows little or no water to pass through it. The polymeric sheet can be a single sheet of polymeric material or two or more sheets of the same or different polymeric materials. The sheet or sheets are preferably composed of a polymeric composition (i.e. a composition which contains a polymer and conventional additives such as fillers) which does not absorb substantial amounts of water, and which can be recycled in the same batch as the edge gaskets, for example a composition based on a polyolefin, particularly high density polyethylene or polypropylene.

The polymeric sheet, and at least one of the polymeric sheets if there is more than one polymeric sheet, preferably has a tensile strength in the machine direction of at least 400 pounds (ASTM D 4595) and in the transverse direction of at least 325 pounds (ASTM D4595).

The Edge Gaskets.

In most cases, each of the edge gaskets, in use, bridges the junction between an edge of the drain and a hard surface bordering the drain. However, it is also possible for the whole of the edge gasket to be over the adjacent hard surface. As noted above, the drain cover assembly may have two, three or four edge gaskets, depending upon the type of drain which is to be protected. Each gasket has an inner gasket portion and an outer gasket portion.

The inner gasket portion contacts and lies over or under an edge portion of the polymeric sheet and preferably is secured to the top or the bottom of the polymeric sheet, for example by sewing. In use, preferably (i) all the inner gasket portion lies over the drain itself or (ii) part of the inner gasket portion lies over the drain and part lies over the hard surface which borders the drain. However, it is also possible for the entire inner gasket portion to lie over the hard surface which borders the drain. The inner gasket portion can for example be 0.5-5.0 inches, for example 2-5 inches, preferably 3-4 inches, wide.

The outer gasket portion extends away from the inner gasket portion and away from the edge of the polymeric sheet. In use, at least part of the outer gasket portion contacts the hard surface which borders the drain. The outer gasket portion can for example be 3-10 inches, preferably 5-7 inches, wide.

The gaskets are preferably composed of a porous nonwoven fabric, for example a melt blown nonwoven fabric, particularly a melt blown polypropylene nonwoven fabric. The fabric can for example have a thickness of 0.01-0.5 inch, preferably 0.1-0.4 inch, e.g. 0.2-0.3 inch. Suitable materials for the gasket are commercially available as geotextile fabrics having a weight of 10-16 ounces per square yard. We have found that the use of a porous nonwoven fabric is advantageous because the outer portion of the gasket, at least part of which contacts the hard surface adjacent the drain, adapts to and clings closely to most hard surfaces, particularly when the gasket is wet. However, the bond between the gasket and the hard surface adjacent the drain can be easily ruptured by pulling the gasket away from the hard surface.

Other materials can be used for the gaskets, for example in gaskets in which the underside of the outer gasket portion is coated with a material that adheres to the hard surface adjacent the drain. The gasket is preferably composed of a single strip of a single fabric, but can comprise two or more different fabrics or materials.

The total horizontal width of the gasket can for example be 4-15 inches, preferably 6-12 inches. The widths of the inner and outer gasket portions can be the same or different.

In the assemblies in which there are three or four gaskets attached to edge portions of the polymeric sheet, the gaskets are preferably joined together at the corners of the polymeric sheet, preferably by sewing and/or staples, optionally using auxiliary pieces of the same or different fabric to secure the corner together.

In the assemblies in which there are only two gaskets attached to opposite edge portions of the polymeric sheet, each end of each gasket preferably extends beyond the polymeric sheet.

Berms on the Gaskets.

Particularly when the central portion of the polymeric sheet allows the liquid to pass through it into the drain, it is preferred that at least one of the gaskets, and optionally each of the gaskets, comprises an upstanding berm. The berm preferably (i) is between the inner gasket portion and the outer gasket portion and (ii) extends upwards away from the inner gasket portion and the outer gasket portion. In use, the berm is parallel to an edge of the polymeric sheet and when a flow of liquid approaches the drain, the berm interrupts the liquid flow so that the liquid ponds behind the berm, and allows any sediment contained in the liquid to at least partially settle behind the berm, before the liquid flows over the berm onto the central portion of the polymeric sheet. In this way, the presence of one or more berms reduces the amount of entrained solids in the liquid passing over the central portion of the polymeric sheet. This increases the likelihood that the drain will function efficiently. When the central portion of the polymeric sheet is impervious to water, the presence of berms is not so important.

The height of the berm can for example be 0.01-5.0 inch, preferably 1-3 inch, e.g. about 1.5 inch. The height of the berm is preferably selected with a view to the expected water flows approaching the drain. When the surface surrounding the drain is flat, it can be best to have only a very shallow berm or no berm at all, to avoid flooding the surface surrounding the drain when there is heavy rainfall.

When the gasket is composed of a fabric, preferably a nonwoven fabric, the berm can conveniently be made by folding a strip of the fabric lengthways and sewing a lengthways seam between the two sides of the fabric, with the distance of the seam from the tip of the fold being approximately the desired height of the berm. The fabric can then be flattened so that the inner and outer gasket portions are horizontal and a berm of the desired height extends upwards from them. The gasket can then be secured to the polymeric sheet.

Internal Gaskets.

In one embodiment of the invention, the central portion of the polymeric sheet is in the form of a broad peripheral border which (i) surrounds an opening which (a) is not covered by the polymeric sheet and, when the drain cover assembly is in use, is open to the drain, and (ii) is surrounded by a plurality of gaskets, each of which comprises a berm, the berms being joined together to form an internal bermcontaining gasket surrounding the opening. Each of the internal gaskets surrounding the opening can be generally the same as the edge gaskets described above, with the inner gasket portion secured to the polymeric sheet; the outer gasket portion may or may not be present.

The Drawings.

In the drawings, the following numerals are used to denote different components of the assemblies.

1 denotes a polymeric sheet which is composed of first and second sheet materials 11 and 12 and, sandwiched between the sheet materials 11 and 12, an additional sheet material 13.

2 denotes a gasket which comprises an inner gasket portion 21, an outer gasket portion 22, and an upstanding berm 23 formed by folding a strip of a porous nonwoven fabric and securing the fold by means of stitches 231.

3 denotes a drain.

4 denotes a hard surface bordering the drain.

15 denotes a rear edge portion of the polymeric sheet which extends upwards from the central portion of the polymeric sheet and can cover at least part of an opening in a curb of a sidewalk 5.

6 denotes an internal gasket which (i) comprises an inner gasket portion 62 and an upstanding berm 63, and (ii) surrounds an opening 7 in the self-supporting polymeric sheet, the opening being defined by a peripheral border portion 8 of the self-supporting sheet.

Figure 1:
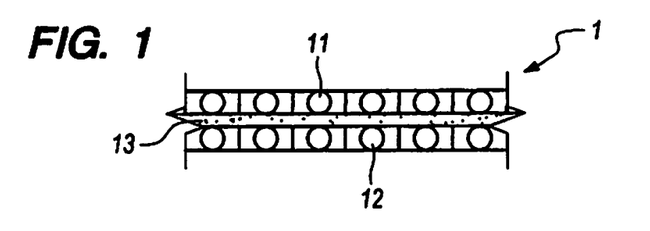
FIG. 1 is a partial cross-section of a polymeric sheet for use in some embodiments of the invention.

Referring now to FIG. 1, each of the first and second sheet materials 11 and 12 is an apertured polymeric sheet material having relatively large apertures therethrough, and the additional sheet material 13 is a sheet material having relatively small apertures therethrough, for example a conventional filter material which retains at least some of the sediment contained in a sediment-containing liquid placed on top of the drain cover. As noted above, in some embodiments of the invention, part or all of the polymeric sheet comprises three sheet materials as shown in FIG. 1. In other embodiments of the invention, the polymeric sheet consists essentially of a single apertured polymeric sheet or two or more apertured polymeric sheets having apertures which allow sediment to pass through the polymeric sheet into the drain.

Figure 2:
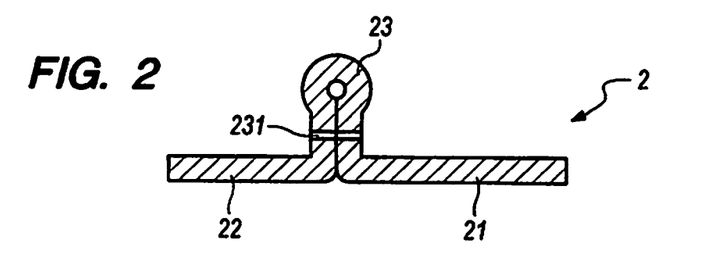
FIG. 2 is a partial cross-section of an edge gasket for use in the invention.

Referring now to FIG. 2, the gasket is formed from a strip of a porous nonwoven fabric which has first been folded lengthways at an intermediate point, optionally at a midpoint of the strip, has then been sewn along the length of the fold, and finally has been flattened into the shape shown in FIG. 2.

Figure 3:
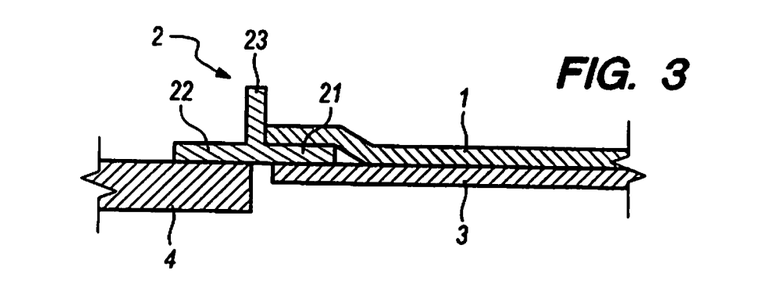
FIGS. 3-7 are partial cross-sections of different covered drain assemblies of the invention.

Referring now to FIG. 3, this shows a gasket 2 bridging the gap between a drain 3 and a hard surface 4 bordering the drain. The inner gasket portion 21 is secured underneath the polymeric sheet 1 and rests on the drain, and the outer gasket portion 22 rests on the hard surface 4.

Figure 4:
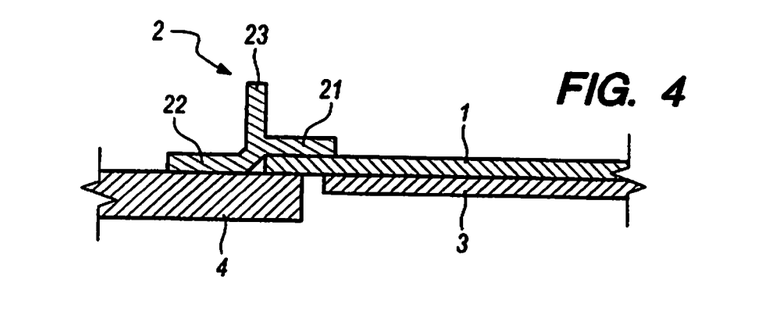

Referring now to FIG. 4, this is the same as FIG. 3 except that the inner gasket portion is secured on top of the polymeric sheet 1.

Figure 5:
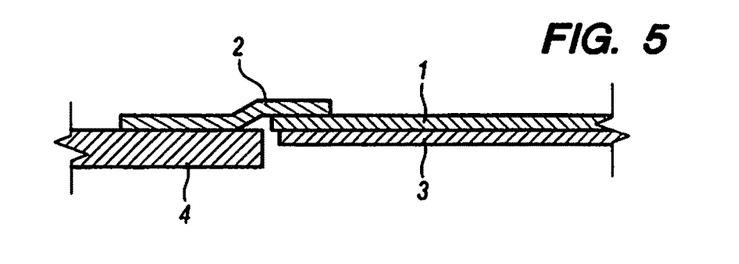

Referring now to FIG. 5, this is the same as FIG. 3, except that the gasket 2 does not have an upstanding berm.

Figure 6:
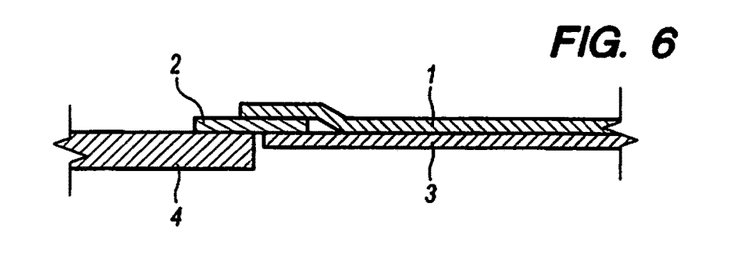

Referring now to FIG. 6, this is the same as FIG. 4, except that the gasket 2 does not have an upstanding berm.

Figure 7:
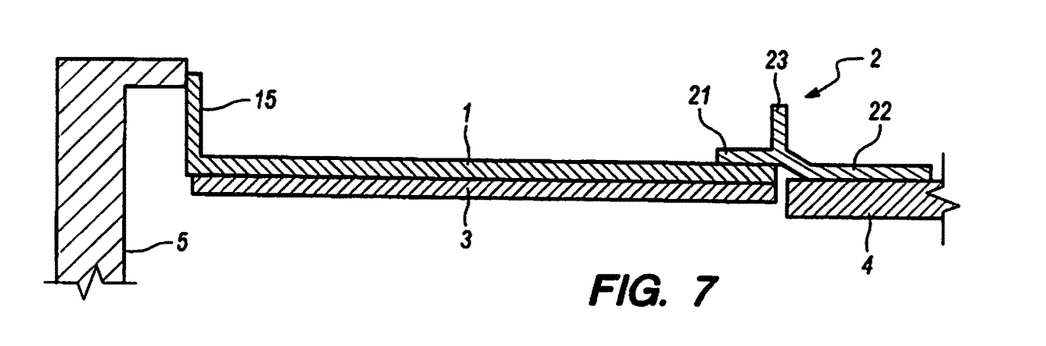

Referring now to FIG. 7, this shows a front gasket 2 bridging the gap between a drain 3 and a hard surface 4 bordering the drain, with the inner gasket portion 21 secured over the polymeric sheet 1 which rests on the drain, and with the outer gasket portion 22 resting on the hard surface 4. A rear portion 15 of the polymeric sheet extends upwards from the horizontal portion of the polymeric sheet and covers an opening in the curb of a sidewalk 5. The rear portion of the polymeric sheet can be secured in place by sandbags (not shown) at each end of the opening.

Figure 8:
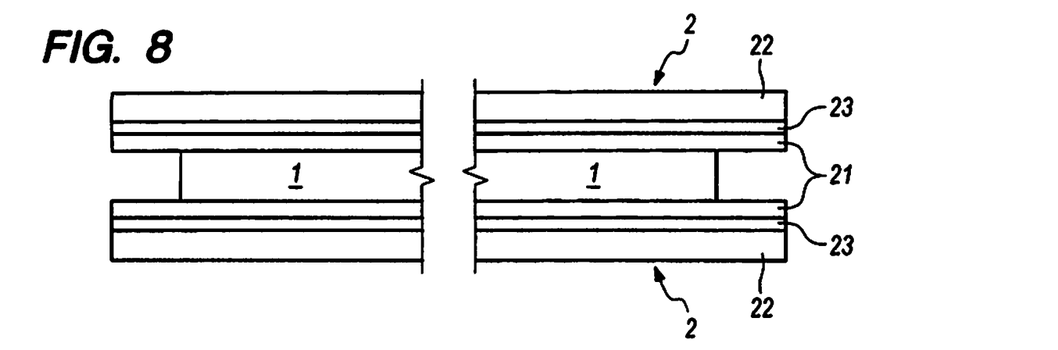
FIGS. 8-11 are plan views of different drain cover assemblies of the invention.

Referring now to FIG. 8, this shows a drain cover assembly which is suitable for the protection of a long thin drain. A gasket 2 is attached to each side of a long thin polymeric sheet 1, with the inner gasket portion 21 secured to the top of the polymeric sheet 1. In use, the polymeric sheet 1 extends beyond the drain.

Figure 9:
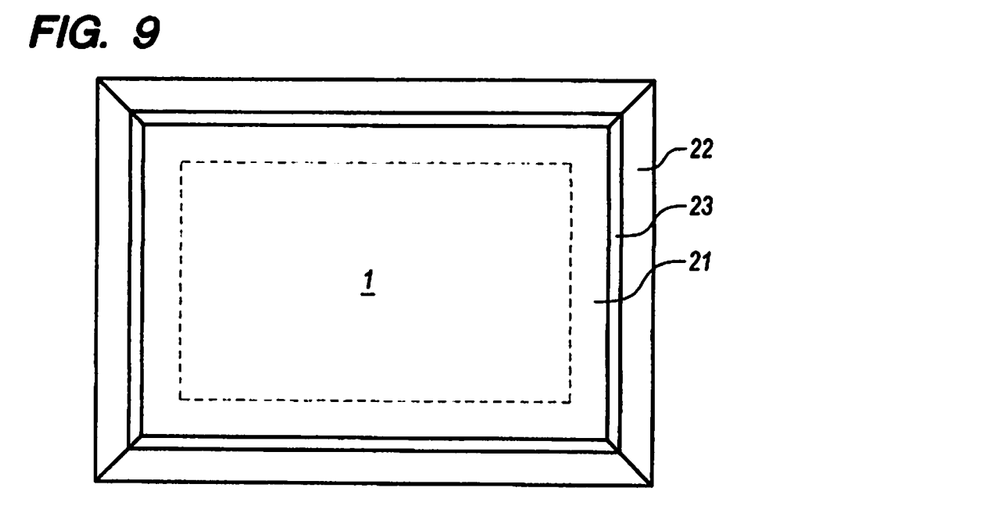

Referring now to FIG. 9, this shows a drain cover assembly which is suitable for the protection of a drain which is bordered on all sides by a hard surface. The assembly comprises four gaskets, one on each edge of the polymeric sheet 1, each gasket having an upstanding berm 23, an inner gasket portion 21 secured underneath the polymeric sheet 1 and an outer gasket portion 22 extending beyond the berm.

Figure 10:
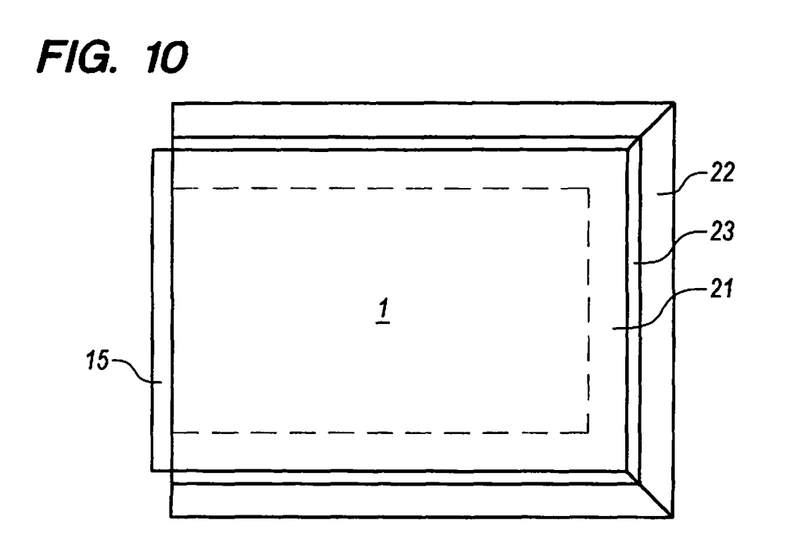

Referring now to FIG. 10, this shows a drain cover assembly which is suitable for the protection of a drain which is bordered at the front and on each side by a hard surface and which terminates at an opening in the curb of a sidewalk. The assembly comprises three gaskets, respectively at the sides and the front of the polymeric sheet 1, each gasket having an upstanding berm 23, with the outer gasket portion 22 extending beyond the berm and the inner gasket portion 21 secured underneath the polymeric sheet 1. The rear edge portion 15 of the polymeric sheet extends upwards from the horizontal portion of the polymeric sheet 1.

Figure 11:
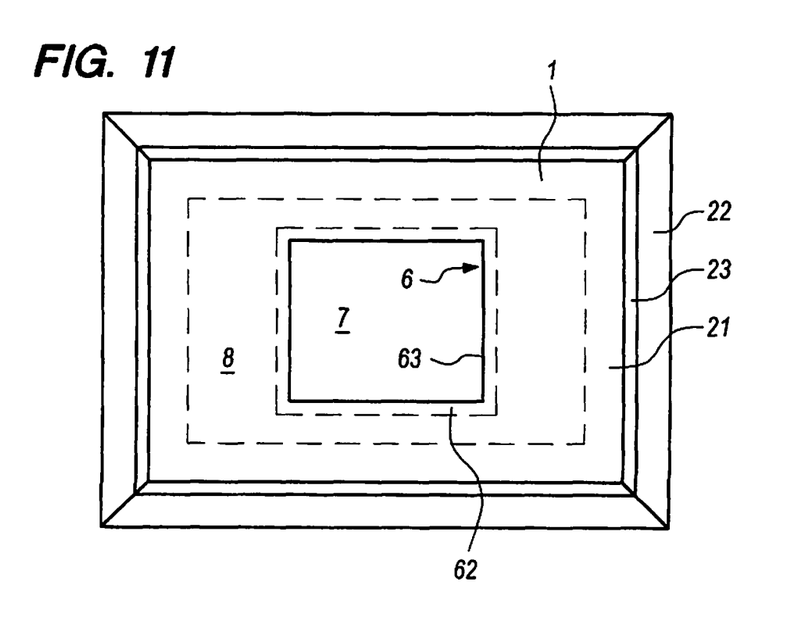

Referring now to FIG. 11, this shows a drain cover assembly which is suitable for the protection of a drain which is bordered on each side by a hard surface and which is likely to be subject to heavy flows of water. The assembly comprises four edge gaskets, one on each edge of the polymeric sheet 1. Each gasket has an upstanding berm 23, an inner gasket portion 21 secured underneath the polymeric sheet 1 and an outer gasket portion 22 extending beyond the berm. There is an opening 7 in the center of the self-supporting polymeric sheet. The opening 7 is surrounded by an internal gasket 6 having an upstanding berm 63 and an internal gasket portion 62 which is secured to the self-supporting polymeric sheet. The polymeric sheet is in the form of a peripheral border portion 8 surrounding the opening.

The invention claimed is:

1. A drain cover assembly which can be placed over a drain in a road and which comprises
 (A) a self-supporting polymeric sheet which comprises
  (1) a central portion,
  (2) a first side edge portion which contacts and extends from one side of the central portion,
  (3) a second side edge portion which contacts and extends from an opposite side of the central portion,
  (4) a front edge portion which (i) contacts and extends from a front edge of the central portion and (ii) is attached to the first and second side edge portions, and
  (5) a rear edge portion which (i) contacts and extends from a rear edge of the central portion and (ii) is attached to the first and second side edge portions;
 (B) a first side edge gasket which (a) is not part of the self-supporting polymeric sheet and (b) comprises (i) an inner gasket portion which contacts and lies over or under the first side edge portion of the polymeric sheet and (ii) an outer gasket portion which extends away from the edge of the first side edge portion of the polymeric sheet; and
 (C) a second side edge gasket which (a) is not part of the self-supporting polymeric sheet and (b) comprises (i)

an inner gasket portion which contacts and lies over or under the second side edge portion of the polymeric sheet and (ii) an outer gasket portion which extends away from the edge of the second side edge portion of the polymeric sheet, and which comprises, in addition to the first side edge gasket and the second side edge gasket, (D) a front edge gasket which (a) is not part of the self-supporting polymeric sheet and (b) (i) comprises an inner gasket portion which contacts and lies over or under the front edge portion of the polymeric sheet, (ii) comprises an outer gasket portion which extends away from the edge of the front edge portion of the polymeric sheet and (iii) contacts the first side edge gasket and the second side edge gasket, and (E) a rear edge gasket which (a) is not part of the self-supporting polymeric sheet and (b) (i) comprises an inner gasket portion which contacts and lies over or under the rear edge portion of the polymeric sheet, (ii) comprises an outer gasket portion which extends away from the edge of the front edge portion of the polymeric sheet and (iii) contacts the first side edge gasket and the second side edge gasket;

wherein each of the first side edge gasket, the second side edge gasket, the front edge gasket and the rear edge gasket comprises an upstanding berm which (i) is parallel to an edge of the central portion of the polymeric sheet, (ii) is between the inner gasket portion and the outer gasket portion of the gasket, (iii) extends upwards away from the inner gasket portion and the outer gasket portion; and (iv) has two ends each of which is joined at a corner of the polymeric sheet to the upstanding berm in another gasket so that an upstanding berm continuously surrounds the central portion of the polymeric sheet;

wherein the central portion of the polymeric sheet is in the form of a broad peripheral border surrounding a single opening which (i) is not covered by the polymeric sheet and (ii) is surrounded by an internal gasket which includes a berm which extends upwards away from the self-supporting polymeric sheet; and wherein there is nothing to impede the flow of water across the polymeric sheet between the berm which continuously surrounds the central portion of the polymeric sheet and the berm of the internal gasket.

2. A drain cover assembly according to claim 1 wherein the self-supporting polymeric sheet consists of polymeric sheet material which is substantially impervious to water.

3. A drain cover assembly according to claim 1 wherein the polymeric sheet comprises (i) a first polymeric sheet which has relatively large apertures therethrough, each of the apertures having an area of 0.01-1.0 in.$^2$, and (ii) a second polymeric sheet which has relatively large apertures therethrough, each of the apertures having an area of 0.01-1.0 in.$^2$, and which may be the same as or different from the first polymeric sheet, and (iii) a polymeric sheet which is sandwiched between the first and second sheets, which has a substantially uniform thickness of less than 0.5 inch, which has relatively small apertures therethrough and which has a mesh size, measured by ASTM E-11, of 80-600 μm.

4. A protected drain assembly which comprises
(1) a drain which is bordered on four sides by a hard surface, and
(2) a drain cover assembly according to claim 1,
wherein
(3) the central portion of the polymeric sheet is supported by the drain, (4) at least part of the inner gasket portion of the first side edge gasket is over the drain or over a part of the hard surface which surrounds the drain, (5) at least part of the outer gasket portion of the first side edge gasket contacts a part of the hard surface which surrounds the drain, (6) at least part of the inner gasket portion of the second side edge gasket is over the drain or over a part of the hard surface which surrounds the drain, (7) at least part of the outer gasket portion of the second side edge gasket contacts a part of the hard surface which surrounds the drain, (8) at least part of the inner gasket portion of the front edge gasket is over the drain or over a part of the hard surface which surrounds the drain, (9) at least part of the outer gasket portion of the front edge gasket is over the drain or over a part of the hard surface which surrounds the drain, (10) at least part of the inner gasket portion of the rear edge gasket is over the drain or over a part of the hard surface which surrounds the drain, and (11) at least part of the outer gasket portion of the rear edge gasket is over the drain or over a part of the hard surface which surrounds the drain.

5. A drain cover assembly which can be placed over a drain in a road and which comprises (A) a self-supporting polymeric sheet which comprises
(1) a central portion,
(2) a first side edge portion which contacts and extends from one side of the central portion,
(3) a second side edge portion which contacts and extends from an opposite side of the central portion,
(4) a front edge portion which (i) contacts and extends from a front edge of the central portion and (ii) is attached to the first and second edge portions, and
(5) a rear edge portion which (i) contacts and extends from a rear edge of the central portion and (ii) is attached to the first and second side edge portions;

(B) a first side edge gasket which (a) is not part of the self-supporting polymeric sheet and (b) comprises (i) an inner gasket portion which contacts and lies over or under the first side edge portion of the polymeric sheet and (ii) an outer gasket portion which extends away from the edge of the first side edge portion of the polymeric sheet; and (C) a second side edge gasket which (a) is not part of the self-supporting polymeric sheet and (b) comprises (i) an inner gasket portion which contacts and lies over or under the second side edge portion of the polymeric sheet and (ii) an outer gasket portion which extends away from the edge of the second side edge portion of the polymeric sheet, and wherein each of the first side edge gasket and the second side edge gasket comprises an upstanding berm which (i) is parallel to an edge of the central portion of the polymeric sheet, (ii) is between the inner gasket portion and the outer gasket portion of the gasket, and (iii) extends upwards away from the inner gasket portion and the outer gasket portion.

6. A drain cover assembly according to claim 5 wherein each of the first side edge gasket and the second side edge gasket (a) is 4-15 inches wide, (b) has an inner gasket portion which is 2-5 inches wide, and (c) has an outer gasket portion which is 3-10 inches wide.

7. A protected drain assembly which comprises
   (1) a drain which is bordered on four sides by a hard surface, and
   (2) a drain cover assembly according to claim 5,
wherein
   (3) the central portion of the polymeric sheet is supported by the drain,
   (4) at least part of the inner gasket portion of the first side edge gasket is over the drain or over a part of the hard surface which surrounds the drain,
   (5) at least part of the outer gasket portion of the first side edge gasket contacts a part of the hard surface which surrounds the drain,
   (6) at least part of the inner gasket portion of the second side edge gasket is over the drain or over a part of the hard surface which surrounds the drain,
   (7) at least part of the outer gasket portion of the second side edge gasket contacts a part of the hard surface which surrounds the drain.

8. A drain cover assembly which can be placed over a drain in a road and which comprises
   (A) a self-supporting polymeric sheet which comprises
      (1) a central portion,
      (2) a first side edge portion which contacts and extends from one side of the central portion,
      (3) a second side edge portion which contacts and extends from an opposite side of the central portion,
      (4) a front edge portion which (i) contacts and extends from a front edge of the central portion and (ii) is attached to the first and second side edge portions, and
      (5) a rear edge portion which (i) contacts and extends from a rear edge of the central portion and (ii) is attached to the first and second side edge portions;
   (B) a first side edge gasket which (a) is not part of the self-supporting polymeric sheet and (b) comprises (i) an inner gasket portion which contacts and lies over or under the first side edge portion of the polymeric sheet and (ii) an outer gasket portion which extends away from the edge of the first side edge portion of the polymeric sheet; and
   (C) a second side edge gasket which (a) is not part of the self-supporting polymeric sheet and (b) comprises (i) an inner gasket portion which contacts and lies over or under the second side edge portion of the polymeric sheet and (ii) an outer gasket portion which extends away from the edge of the second side edge portion of the polymeric sheet, and
wherein each of the first side edge gasket and the second side edge gasket (a) comprises a strip of a porous nonwoven fabric and (b) includes an upstanding berm which (i) is parallel to an edge of the central portion of the polymeric sheet, (ii) is between the inner gasket portion and the outer gasket portion, (iii) extends upwards away from the inner gasket portion and the outer gasket portion, and (iv) has been formed by folding the strip of porous nonwoven fabric.

9. A drain cover assembly according to claim 8 wherein the polymeric sheet comprises (i) a first polymeric sheet which has relatively large apertures therethrough, each of the apertures having an area of 0.01-1.0 in.$^2$, and (ii) a second polymeric sheet which has relatively large apertures therethrough, each of the apertures having an area of 0.01-1.0 in.$^2$, and which may be the same as or different from the first polymeric sheet, and (iii) a polymeric sheet which is sandwiched between the first and second sheets, which has a substantially uniform thickness of less than 0.5 inch, which has relatively small apertures therethrough and which has a mesh size, measured by ASTM E-11, of 80-600 µm.

10. A drain cover assembly according to claim 8 wherein each of the first side edge gasket and the second side edge gasket (a) is 4-15 inches wide, (b) has an inner gasket portion which is 2-5 inches wide, and (c) has an outer gasket portion which is 3-10 inches wide.

11. A protected drain assembly which comprises
   (1) a drain which is bordered on two sides by a hard surface, and
   (2) a drain cover assembly according to claim 8,
wherein
   (3) the central portion of the polymeric sheet is supported by the drain,
   (4) at least part of the inner gasket portion of the first side edge gasket is over the drain or over a part of the hard surface which surrounds the drain,
   (5) at least part of the outer gasket portion of the first side edge gasket contacts a part of the hard surface which surrounds the drain,
   (6) at least part of the inner gasket portion of the second side edge gasket is over the drain or over a part of the hard surface which surrounds the drain, and
   (7) at least part of the outer gasket portion of the second side edge gasket contacts a part of the hard surface which surrounds the drain.

12. A drain cover assembly which can be placed over a drain in a road and which comprises
   (A) a self-supporting polymeric sheet which consists of polymeric material and which comprises
      (1) a central portion comprising apertures which allow water to pass through the central portion,
      (2) a first side edge portion which contacts and extends from one side of the central portion,
      (3) a second side edge portion which contacts and extends from an opposite side of the central portion,
      (4) a front edge portion which (i) contacts and extends from a front edge of the central portion and (ii) is attached to the first and second side edge portions,
      (5) a rear edge portion which (i) contacts and extends from a rear edge of the central portion and (ii) is attached to the first and second side edge portions;
   (B) a first side edge gasket which (a) is not part of the self-supporting polymeric sheet and (b)(i) comprises an inner gasket portion which contacts and lies over or under the first side edge portion of the polymeric sheet and (ii) comprises an outer gasket portion which extends away from the edge of the first side edge portion of the polymeric sheet,
   (C) a second side edge gasket which (a) is not part of the self-supporting polymeric sheet and (b)(i) comprises an inner gasket portion which contacts and lies over or under the second side edge portion of the polymeric sheet and (ii) comprises an outer gasket portion which extends away from the edge of the second side edge portion of the polymeric sheet,
   (D) a front edge gasket which (a) is not part of the self-supporting polymeric sheet and (b) (i) comprises an inner gasket portion which contacts and lies over or under the front edge portion of the polymeric sheet, (ii) comprises an outer gasket portion which extends away from the edge of the front edge portion of the polymeric sheet and (iii) contacts the first side edge gasket and the second side edge gasket, and
   (E) a rear edge gasket which (a) is not part of the self-supporting polymeric sheet and (b)(i) comprises an inner gasket portion which contacts and lies over or under the rear edge portion of the polymeric sheet, (ii) comprises an outer gasket portion which extends away from the edge of the front edge portion of the polymeric sheet, and (iii) contacts the first side edge gasket and the second side edge gasket, and wherein each of the first side edge gasket, the second side edge gasket, the front edge gasket and the rear edge gasket comprises a strip of a porous nonwoven fabric, and wherein each of the first side edge gasket, the second side edge gasket, the front edge gasket and the rear edge gasket (a) includes an upstanding berm which (i) is parallel to an edge of the central portion of the polymeric sheet, (ii) is between the inner gasket portion and the outer gasket portion, and (iii) extends upwards away from the inner gasket portion and the outer gasket portion, and (b) has two ends, each of which is joined at a corner of the polymeric sheet to another gasket so that an upstanding berm continuously surrounds the central portion of the polymeric sheet.

13. A drain cover assembly according to claim 12 wherein each of the first side edge gasket, the second side edge gasket, the front side edge gasket and the rear side edge gasket (a) is 4-15 inches wide, (b) has an inner gasket portion which is 2-5 inches wide, and (c) has an outer gasket portion which is 3-10 inches wide.

14. A drain cover assembly according to claim 12 wherein each of the first side edge gasket, the second side edge gasket, the front edge gasket and the rear edge gasket is composed of a melt blown polypropylene nonwoven fabric.

15. A drain cover assembly according to claim 12 wherein the polymeric sheet comprises (i) a first polymeric sheet which has relatively large apertures therethrough, each of the apertures having an area of 0.01-1.0 in.$^2$, and (ii) a second polymeric sheet which has relatively large apertures therethrough, each of the apertures having an area of 0.01-1.0 in.$^2$, and which may be the same as or different from the first polymeric sheet, and (iii) a polymeric sheet which is sandwiched between the first and second sheets, which has a substantially uniform thickness of less than 0.5 inch, which has relatively small apertures therethrough and which has a mesh size, measured by ASTM E-11, of 80-600 μm.

16. A protected drain assembly which comprises
(1) a drain which is bordered on two sides by a hard surface, and
(2) a drain cover assembly according to claim 12,
wherein
(3) the central portion of the polymeric sheet is supported by the drain,
(4) at least part of the inner gasket portion of the first side edge gasket is over the drain or over a part of the hard surface which surrounds the drain,
(5) at least part of the outer gasket portion of the first side edge gasket contacts a part of the hard surface which surrounds the drain,
(6) at least part of the inner gasket portion of the second side edge gasket is over the drain or over a part of the hard surface which surrounds the drain,
(7) at least part of the outer gasket portion of the second side edge gasket contacts a part of the hard surface which surrounds the drain,
(8) at least part of the inner gasket portion of the front edge gasket is over the drain or over a part of the hard surface which surrounds the drain,
(9) at least part of the outer gasket portion of the front edge gasket is over the drain or over a part of the hard surface which surrounds the drain,
(10) at least part of the inner gasket portion of the rear edge gasket is over the drain or over a part of the hard surface which surrounds the drain, and
(11) at least part of the outer gasket portion of the rear edge gasket is over the drain or over a part of the hard surface which surrounds the drain.

17. A drain cover assembly which can be placed over a drain in a road and which comprises
(A) a self-supporting polymeric sheet which comprises
(1) a central portion which comprises one or more apertured sheet materials in which the apertures allow liquid to pass through the sheet,
(2) a first side edge portion which contacts and extends from one side of the central portion,
(3) a second side edge portion which contacts and extends from an opposite side of the central portion,
(4) a front edge portion which (i) contacts and extends from a front edge of the central portion and (ii) is attached to the first and second side edge portions, and
(5) a rear edge portion which (i) contacts and extends from a rear edge of the central portion and (ii) is attached to the first and second side edge portions,
(B) a first side edge gasket which (a) is not part of the self-supporting polymeric sheet and (b) comprises (i) an inner gasket portion which contacts and lies over or under the first side edge portion of the polymeric sheet and (ii) an outer gasket portion which extends away from the edge of the first side edge portion of the polymeric sheet;
(C) a second side edge gasket which (a) is not part of the self-supporting polymeric sheet and (b) comprises (i) an inner gasket portion which contacts and lies over or under the second side edge portion of the polymeric sheet and (ii) an outer gasket portion extends away from the edge of the second side edge portion of the polymeric sheet;
(D) a front edge gasket which (a) is not part of the self-supporting polymeric sheet, (b) contacts the first side edge gasket and the second side edge gasket, and (c) comprises (i) an inner gasket portion which contacts and lies over or under the front edge portion of the polymeric sheet, and (ii) an outer gasket portion which extends away from the edge of the front edge portion of the polymeric sheet; and
(E) a rear edge gasket which (a) is not part of the self-supporting polymeric sheet, (b) contacts the first side edge gasket and the second side edge gasket, and (c) comprises (i) an inner gasket portion which contacts and lies over or under the rear edge portion of the polymeric sheet, and (ii) an outer gasket portion which extends away from the edge of the rear edge portion of the polymeric sheet, and wherein each of the first side edge gasket, the second side edge gasket, the front edge gasket and the rear edge gasket (a) includes an upstanding berm which (i) is parallel to an edge of the central portion of the polymeric sheet, (ii) is between the inner gasket portion and the outer gasket portion, and (iii) extends upwards away from the inner gasket portion and the outer gasket portion, and (b) has two ends, each of which is joined at a corner of the central portion of the polymeric sheet to another gasket so that an upstanding berm continuously surrounds the central portion of the polymeric sheet.

18. A drain cover assembly according to claim 17 wherein each of the first side edge gasket, the second side edge gasket, the front edge gasket and the rear edge gasket (a) is 4-15 inches wide, (b) has an inner gasket portion which is 2-5 inches wide, and (c) has an outer gasket portion which is 3-10 inches wide.

19. A drain cover assembly according to claim 17 wherein the polymeric sheet is substantially impervious to water.

20. A drain cover assembly according to claim 17 wherein the polymeric sheet comprises (i) a first polymeric sheet which has relatively large apertures therethrough, each of the apertures having an area of 0.01-1.0 in.$^2$, and (ii) a second polymeric sheet which has relatively large apertures therethrough, each of the apertures having an area of 0.01-1.0 in.$^2$, and which may be the same as or different from the first polymeric sheet, and (iii) a polymeric sheet which is sandwiched between the first and second sheets, which has a substantially uniform thickness of less than 0.5 inch, which has relatively small apertures therethrough and which has a mesh size, measured by ASTM E-11, of 80-600 μm.

21. A protected drain assembly which comprises
    (1) a drain which is bordered on two sides by a hard surface, and
    (2) a drain cover assembly according to claim 17,
wherein
    (3) the central portion of the polymeric sheet is supported by the drain,
    (4) at least part of the inner gasket portion of the first side edge gasket is over the drain or over a part of the hard surface which surrounds the drain,
    (5) at least part of the outer gasket portion of the first side edge gasket contacts a part of the hard surface which surrounds the drain,
    (6) at least part of the inner gasket portion of the second side edge gasket is over the drain or over a part of the hard surface which surrounds the drain,
    (7) at least part of the outer gasket portion of the second side edge gasket contacts a part of the hard surface which surrounds the drain,
    (8) at least part of the inner gasket portion of the front edge gasket is over the drain or over a part of the hard surface which surrounds the drain,
    (9) at least part of the outer gasket portion of the front edge gasket is over the drain or over a part of the hard surface which surrounds the drain,
    (10) at least part of the inner gasket portion of the rear edge gasket is over the drain or over a part of the hard surface which surrounds the drain, and
    (11) at least part of the outer gasket portion of the rear edge gasket is over the drain or over a part of the hard surface which surrounds the drain.

22. A drain cover assembly which can be placed over a drain in a road and which comprises
    (A) a self-supporting polymeric sheet which comprises
        (1) a central portion which comprises one or more apertured sheet materials in which the apertures allow liquid to pass through the sheet,
        (2) a first side edge portion which contacts and extends from one side of the central portion,
        (3) a second side edge portion which contacts and extends from an opposite side of the central portion,
        (4) a front edge portion which (i) contacts and extends from a front edge of the central portion and (ii) is attached to the first and second side edge portions, and
        (5) a rear edge portion which (i) contacts and extends from a rear edge of the central portion and (ii) is attached to the first and second edge portions;
    (B) a first side edge gasket which (a) is not part of the self-supporting polymeric sheet and (b) comprises (i) an inner gasket portion which contacts and lies over or under the first side edge portion of the polymeric sheet and (ii) an outer gasket portion which extends away from the edge of the first side edge portion of the polymeric sheet;
    (C) a second side edge gasket which (a) is not part of the self-supporting polymeric sheet and (b) comprises (i) an inner gasket portion which contacts and lies over or under the second side edge portion of the polymeric sheet and (ii) an outer gasket portion extends away from the edge of the second side edge portion of the polymeric sheet;
    (D) a front edge gasket which (a) is not part of the self-supporting polymeric sheet, (b) contacts the first side edge gasket and the second side edge gasket, and (c) comprises (i) an inner gasket portion which contacts and lies over or under the front edge portion of the polymeric sheet, and (ii) an outer gasket portion which extends away from the edge of the front edge portion of the polymeric sheet; and
    (E) a rear edge gasket which (a) is not part of the self-supporting polymeric sheet, (b) contacts the first side edge gasket and the second side edge gasket, and (c) comprises (i) an inner gasket portion which contacts and lies over or under the rear edge portion of the polymeric sheet, and (ii) an outer gasket portion which extends away from the edge of the rear edge portion of the polymeric sheet, and
wherein the central portion of the polymeric sheet is in the form of a broad peripheral border surrounding an opening which (i) is not covered by the polymeric sheet and (ii) is surrounded by an internal gasket which includes a berm which extends upwards away from the self-supporting polymeric sheet.

23. A drain cover assembly which can be placed over a drain in a road and which comprises
    (A) a self-supporting polymeric sheet which comprises
        (1) a central portion which comprises one or more apertured sheet materials in which the apertures allow liquid to pass through the sheet,
        (2) a first side edge portion which contacts and extends from one side of the central portion,
        (3) a second side edge portion which contacts and extends from an opposite side of the central portion,
        (4) a front edge portion which (i) contacts and extends from a front edge of the central portion and (ii) is attached to the first and second edge portions, and
        (5) a rear edge portion which (i) contacts and extends from a rear edge of the central portion and (ii) is attached to the first and second edge portions;
    (B) a first side edge gasket which (a) is not part of the self-supporting polymeric sheet and (b) comprises (i) an inner gasket portion which contacts and lies over or under the first side edge portion of the polymeric sheet and (ii) an outer gasket portion which extends away from the edge of the first side edge portion of the polymeric sheet;
    (C) a second side edge gasket which (a) is not part of the self-supporting polymeric sheet and (b) comprises (i) an inner gasket portion which contacts and lies over or under the second side edge portion of the polymeric sheet and (ii) an outer gasket portion extends away from the edge of the second side edge portion of the polymeric sheet;
    (D) a front edge gasket which (a) is not part of the self-supporting polymeric sheet, (b) contacts the first side edge gasket and the second side edge gasket, and (c) comprises (i) an inner gasket portion which contacts and lies over or under the front edge portion of the polymeric sheet, and (ii) an outer gasket portion which extends away from the edge of the front edge portion of the polymeric sheet; and (E) a rear edge gasket which (a) is not part of the self-supporting polymeric sheet, (b) contacts the first side edge gasket and the second side edge gasket, and (c) comprises (i) an inner gasket portion which contacts and lies over or under the rear edge portion of the polymeric sheet, and (ii) an outer gasket portion which extends away from the edge of the rear edge portion of the polymeric sheet, wherein each of the first side edge gasket, the second side edge gasket, the front edge gasket and the rear edge gasket comprises a porous nonwoven fabric, and wherein each of the first side edge gasket, the second side edge gasket, the front edge gasket and the rear edge gasket includes an upstanding berm which (i) is parallel to an edge of the central portion of the polymeric sheet, (ii) is between the inner gasket portion and the outer gasket portion, (iii) extends upwards away from the inner gasket portion and the outer gasket portion, and (iv) has been formed by folding a strip of porous nonwoven fabric.

24. A drain cover assembly according to claim 23 wherein the self-supporting polymeric sheet is substantially impervious to water.

25. A drain cover assembly according to claim 23 wherein the polymeric sheet comprises (i) a first polymeric sheet which has relatively large apertures therethrough, each of the apertures having an area of 0.01-1.0 in.$^2$, and (ii) a second polymeric sheet which has relatively large apertures therethrough, each of the apertures having an area of 0.01-1.0 in.$^2$, and which may be the same as or different from the first polymeric sheet, and (iii) a polymeric sheet which is sandwiched between the first and second sheets, which has a substantially uniform thickness of less than 0.5 inch, which has relatively small apertures therethrough and which has a mesh size, measured by ASTM E-11, of 80-600 μm.

26. A protected drain assembly which comprises
 (1) a drain which is bordered on four sides by a hard surface, and
 (2) a drain cover assembly according to claim 23,
wherein
 (3) the central portion of the polymeric sheet is supported by the drain,
 (4) at least part of the inner gasket portion of the first side edge gasket is over the drain or over a part of the hard surface which surrounds the drain,
 (5) at least part of the outer gasket portion of the first side edge gasket contacts a part of the hard surface which surrounds the drain,
 (6) at least part of the inner gasket portion of the second side edge gasket is over the drain or over a part of the hard surface which surrounds the drain,
 (7) at least part of the outer gasket portion of the second side edge gasket contacts a part of the hard surface which surrounds the drain,
 (8) at least part of the inner gasket portion of the front edge gasket is over the drain or over a part of the hard surface which surrounds the drain,
 (9) at least part of the outer gasket portion of the front edge gasket is over the drain or over a part of the hard surface which surrounds the drain,
 (10) at least part of the inner gasket portion of the rear edge gasket is over the drain or over a part of the hard surface which surrounds the drain, and
 (11) at least part of the outer gasket portion of the rear edge gasket is over the drain or over a part of the hard surface which surrounds the drain.

* * * * *